United States Patent
Borrelli et al.

(10) Patent No.: US 6,654,168 B1
(45) Date of Patent: Nov. 25, 2003

(54) INORGANIC VISIBLE LIGHT REFLECTION POLARIZER

(75) Inventors: Nicholas F. Borrelli, Elmira, NY (US); David Dawson-Elli, Painted Post, NY (US); David G. Grossman, Corning, NY (US); Nicholas J. Visovsky, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/623,867

(22) PCT Filed: Mar. 25, 1999

(86) PCT No.: PCT/US99/06598

§ 371 (c)(1), (2), (4) Date: Sep. 7, 2000

(87) PCT Pub. No.: WO99/50693

PCT Pub. Date: Oct. 7, 1999

Related U.S. Application Data (60) Provisional application No. 60/080,096, filed on Mar. 31, 1998.

(51) Int. Cl.$^7$ .................................................. G02B 5/30
(52) U.S. Cl. ........................ 359/487; 359/483; 359/495; 359/496; 359/497; 359/500; 349/9; 349/57; 349/113
(58) Field of Search ................................. 359/483, 487, 359/497, 452, 500, 495, 584, 496; 349/9, 57, 113

(56) References Cited

U.S. PATENT DOCUMENTS

| | | | | |
|---|---|---|---|---|
| 4,322,130 A | * | 3/1982 | Ito et al. ..................... 359/584 |
| 4,556,292 A | | 12/1985 | Mathyssek et al. ......... 350/394 |
| 5,357,370 A | * | 10/1994 | Miyatake et al. ............ 359/495 |
| 5,729,306 A | * | 3/1998 | Miyake et al. ................. 349/9 |
| 6,040,942 A | * | 3/2000 | Bergmann ................... 359/487 |
| 6,072,629 A | * | 6/2000 | Fan et al. .................... 359/497 |
| 6,144,491 A | * | 11/2000 | Orisaka et al. ............. 359/452 |

FOREIGN PATENT DOCUMENTS

| | | | |
|---|---|---|---|
| GB | 0789597 | 9/1955 | |
| GB | 2031606 A | * 4/1980 | .................. 359/496 |
| JP | 57-164717 | 10/1982 | ............. G02F/1/29 |
| JP | 60-128404 | 7/1985 | ............. G02B/5/30 |

* cited by examiner

Primary Examiner—Audrey Chang
Assistant Examiner—Craig Curtis
(74) Attorney, Agent, or Firm—Vincent T. Kung (57) ABSTRACT

A reflective polarzier for visible light wavelengths formed of a plurality of polarizer units. Each polarizer unit having a transparent, inorganic substrate with first and second opposing surfaces. The first surface is coated with a single layer of a dielectric material, and the second surface is coated with a layer of a highly reflective metal film or a dielectric material. The polarizer is configured to produce a "quasi-straight path," such that a light ray exiting the substrate is substantially parallel with a corresponding, incident light ray entering the substrate. The polarizer exhibits polarization over the entire visible spectrum.

67 Claims, 8 Drawing Sheets

FIG. 8

INORGANIC VISIBLE LIGHT REFLECTION POLARIZER

This application claims the benefit of provisional application Ser. No. 60/080,096 filed Mar. 31, 1998.

BACKGROUND OF THE INVENTION

The present invention relates to optical polarizers, in particular, to an inorganic visible light polarizer.

In the liquid crystal display (LCD) industry, particularly for projection color television applications, it is required to polarize the light of the projection light source prior to its impingement on the LCD panel that in turn blocks or transmits the light via selective polarization by sub-pixel cells in the LCD panel. The transmitted light passes through the sub-pixel color filters thus creating a projected color image. Recently, there has developed a trend towards larger screen sizes in the projection color television technology. This, in turn, has created a need for more intense light sources to maintain sufficiently bright projected images on these larger screens. The use of more intense light sources on the other hand, places such a high energy load (thermal and photonic), on the light polarizer that organic polarizers, which are sometimes used in projection televisions, degrade over time leading to degradation of image quality. In order to address this problem, pre-polarizers made of inorganic materials have been placed between the light source and the main (organic) polarizer. The inorganic pre-polarizer is able to withstand the increased energy of the light source while at the same time reducing the load, which is placed on the organic polarizer.

Various types of polarizers are known, including, dichroic, wire grid, anisotropic crystal, as well as reflective and transmissive Brewster's angle polarizers. The differences between these polarizers are described in *High-quality Brewster's angle polarizer for broadband infrared application*, APPLIED OPTICS, Vol. 37, No. 7, pp. 1194–1204 (Mar. 1, 1998). As described therein, Brewster angle polarizers rely on the different transmission and reflection coefficients for s- and p-wave polarization at the interface between two materials. The Brewster angle of a polarizer is the angle of maximum polarization with respect to the incident radiation, and depends on the angle of incidence and the refractive index of the material.

So-called Brewster-angle polarizers use transmissive substrates with multiple coatings made of optically transparent dielectric materials that are alternated with material of different indicies of refraction (e.g., alternate layers of magnesium fluoride and zinc sulfide). In many of these polarizers, light is incident on the dielectric coating and the Brewster angle is dependent on the refractive index of the dielectric material. One illustrative example of a multi-layered dieletric polarizer is described in U.S. Pat. No. 4,515,441, which discloses applying to each of two surfaces of a fused quartz substrate, three-layers of dieletric material. The resulting dieletric polarizer operates at the Brewster angle of the dielectric layer. In addition to other problems, a drawback of multi-layered dielectric polariziers is that they suffer damage due to localized heating in the multiple layers caused by multiphoton absorption. For example, in U.S. Pat. No. 4,553,822, a Brewster angle polarizer is described which uses multiple layers of dielectric material sandwiched between two transparent substrates. Other types of inorganic polarizers for visible light, such as Glan-Thompson calcite prisms or broadband splitter cubes, have not found widespread application in the LCD industry.

Therefore, there continues to be a need for the development of durable and effective inorganic, visible light polarizers. Accordingly, it is the object of the present invention to provide a simple and effective, visible light polarizer.

SUMMARY OF THE INVENTION

The present invention relates to the design and production of a polarizer unit, which exhibits effective polarization over the entire visible spectrum. The polarizer unit includes a transparent, inorganic substrate, like glass, coated on a first surface with a single layer of dielectric material and a second surface with a layer of either a highly reflective metal film or dielectric material. Preferably, the dielectric material exhibits a high reflectivity, which stems from the real part of the refractive index of the material. More preferably, the refractive index of the dielectric material is appreciably higher than that of the transparent substrate. Further, the dielectric material has a low absorption, and its refractive index and absorption are relatively constant over the spectrum of visible wavelengths. Significantly, the polarizer is configured to produce a "quasi-straight path," such that a light ray exiting the substrate is substantially parallel with a corresponding incident light ray entering the substrate. In other words, a light beam exiting the polarizer maintains the same, original direction as the corresponding incident light beam entering the polarizer (See, FIG. 4).

In another aspect, the invention relates to a visible light polarizer including a transparent substrate having two opposite planar coated surfaces and two opposite edges (an entrance and exit edge), cut and polished to be parallel to each other, the plane of the entrance edge being cut and polished to form an angle equivalent to the Brewster angle relative to the plane of the surface of the substrate having a film of dielectric material, the plane of the second edge being cut and polished to form an angle equivalent to the Brewster angle relative to the plane of surface of the substrate having a fully reflective metal film, such that the distance between the planes of the two edges is a function of the type dielectric material used, the thickness of the substrate.

In a further aspect, the invention relates to a bi-directional polarizer characterized in that equal polarizer performance is obtained regardless of the direction on light entry.

In still another aspect, the invention relates to visible light polarizer designed to have a light path that has the incident light enter the first edge and travel through the transparent substrate prior to striking the dielectric film on one surface of the substrate. The inventive light path design pairs the index of refraction of the transparent substrate with the higher index of refraction of the dielectric film. Since the refractive index of the transparent substrate is greater than the refractive index of air, this inventive pairing of the refractive index of the substrate and the refractive index of the dielectric film results in superior polarization relative to pairing of the index of refraction of air with the index of refraction of said first film.

The preferred optical polarizer of the present invention is a miniaturized polarizer made by assembling several polarizer units as described below.

DETAILED DESCRIPTION OF THE INVENTION

One particularly useful method of producing a miniaturized polarizer according to the invention is by:

a) preparing a plurality of substrates having two opposite planar surfaces;

b) applying to one surface of the substrates a thin film or layer of dielectric material, and optionally, applying a layer of a light-absorbing material such as carbon or graphite over the thin film of dielectric material;

c) applying to the second surface of each substrate, a film of highly reflecting metal or a dielectric film;

d) assembling the substrates in parallel with the graphite film of each substrate in contact with the metal film of an adjacent substrate to form a boule; and e) cutting the boule into individual polarizer devices.

Any suitable transparent material may be used as the substrate. Particularly useful substrates are those characterized by having low light absorption at desired wavelengths, appropriate indices of refraction so that when paired with the indices of refraction of the dielectric material, yield optimum polarization performance. Examples of useful substrate materials include, fused silica, glass and glass-ceramics. Other desirable properties may be imparted to the polarizer by selecting as the substrate, materials having desired properties. For example, glasses which absorb light of selected wavelengths, such as UV absorbing glasses may be used as the substrate. Finally, the length, width and thickness of the substrate will depend on the nature of the desired polarizer.

Examples of useful dielectric materials for the polarizer include, polycrystalline silicon, amorphous silicon, gallium phosphide, aluminum arsenide, aluminum phosphate, silicon carbide, zinc selenide, zinc sulfide, zinc telluride and other similar materials. The thickness of the dielectric layer will vary, depending on the refractive index and light absorption of the dielectric material. For any given dielectric material, the optimum thickness of the dielectric layer will vary and therefore, will be determined by experimentation. The optimum thickness is that thickness outside which throughput of the S polarization component decreases. Above the optimum thickness, optical absorption of the S polarization component increases, and below it optical reflection of the S polarization component decreases. For the polycrystalline silicon material used in the example, the optimum thickness was found to be in the range of 26 to 36 nm. Similarly, the thickness of the highly reflecting material may vary depending on the material. The thickness must be such as to effectively turn or redirect substantially all the light which is reflected from the first dielectric layer.

Polycrystalline silicon is a particularly useful dielectric material for enhancing the polarization effect because of its high index of refraction relative to glass, its low absorption, and the fact that both its index of refraction and its absorption are relatively constant over the visible wavelength spectrum. The combinations of high index of refraction and low absorption significantly enhance the separation of p- and s- polarization components.

Any effective light-absorbing material can be applied over the surface of the dielectric film. Examples of useful light-absorbing materials include, carbon and graphite. The thickness of the light absorbing material will depend in part on the thickness of the dielectric material but should be sufficient to prevent or control light transmission through the dielectric layer.

Any highly reflective metal can be applied to the opposite planar surface of the substrate. Useful examples include, silver and aluminum.

In its most basic form, the inventive polarizer is constructed by coating one of the surfaces of the substrate with a dielectric material. In a preferred embodiment, the second surface of the substrate is coated with a highly reflecting material such as a silver or aluminum. In another embodiment, the highly reflecting material is replaced with the same or a different dielectric material as that coated on the first surface. In either case, the dielectric material is selected so that when paired with the refractive index of the substrate, gives optimum polarizing performance. For example, we have found that for a substrate having a refractive index of about 1.5, optimal polarizing performance can be obtained dielectric material having refractive index in the range of 3.5 to 4.5. The refractive index of polycrystalline silicon is about 4.

The invention will now be described with reference to the drawings.

It is known that light polarization can be obtained by directing non-polarized light at nonnormal incident angle onto a reflective surface such as that of a glass sheet. Even though the reflected light in such a system is nearly 100% plane polarized, the intensity of the light that is reflected is significantly less than that of the incident light. The reason for this is that there is an absence of one plane of polarization—the P polarization component. In addition, in such a system, the S polarization component is not fully reflected and passes through the glass sheet along with the P polarization component. As a result, such a polarizer is not practical due to the excessive loss of the desired S polarization via transmission.

Figure 1:
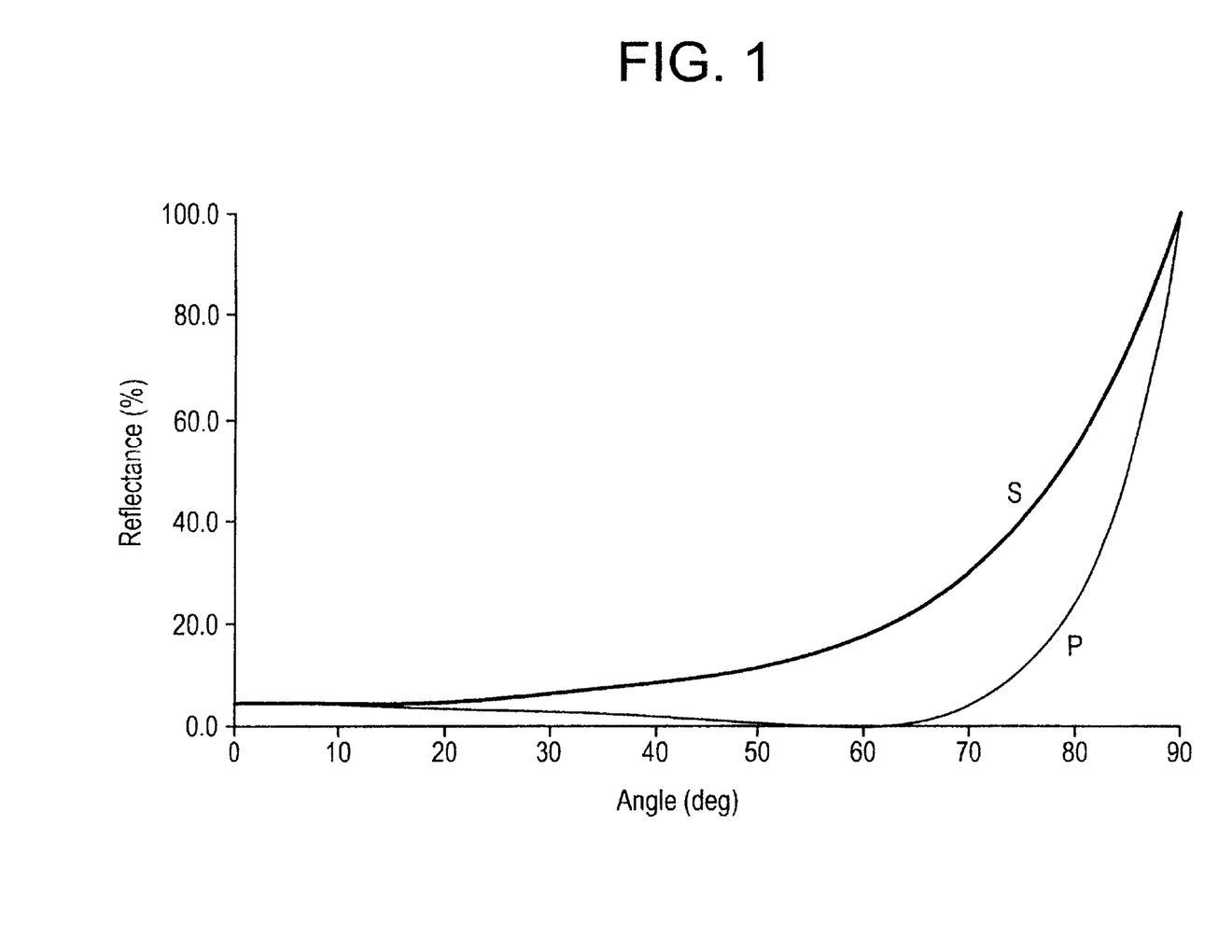
FIG. 1 is a graph showing the calculated P and S polarization components reflected from an uncoated sheet of glass over the full range of incident angles.

Conversely, while the intensity of the light that is transmitted through the glass is much higher, it consists of both P and S polarization components with the S component being somewhat lower because a certain amount has been reflected. Thus, the transmitted light, although partly polarized, is not sufficiently polarized to give a high contrast ratio. FIG. 1 shows the calculated P and S polarization components reflected from an uncoated sheet of glass over the full range of incident angles. As indicated, at incident angles in the 50° region, the P polarization component appears not to be reflected. Specifically, at 56° the P polarization component disappears. This is the Brewster or polarizing angle for the glass.

It has been shown by others that potentially useful nonnormal incidence reflection and transmission polarizers can be obtained by "enhancing" the above phenomenon by applying thin films of metals or dielectric materials to the surface of the transparent substrate to modify overall reflectivity, transmission and absorption.

Figure 2:
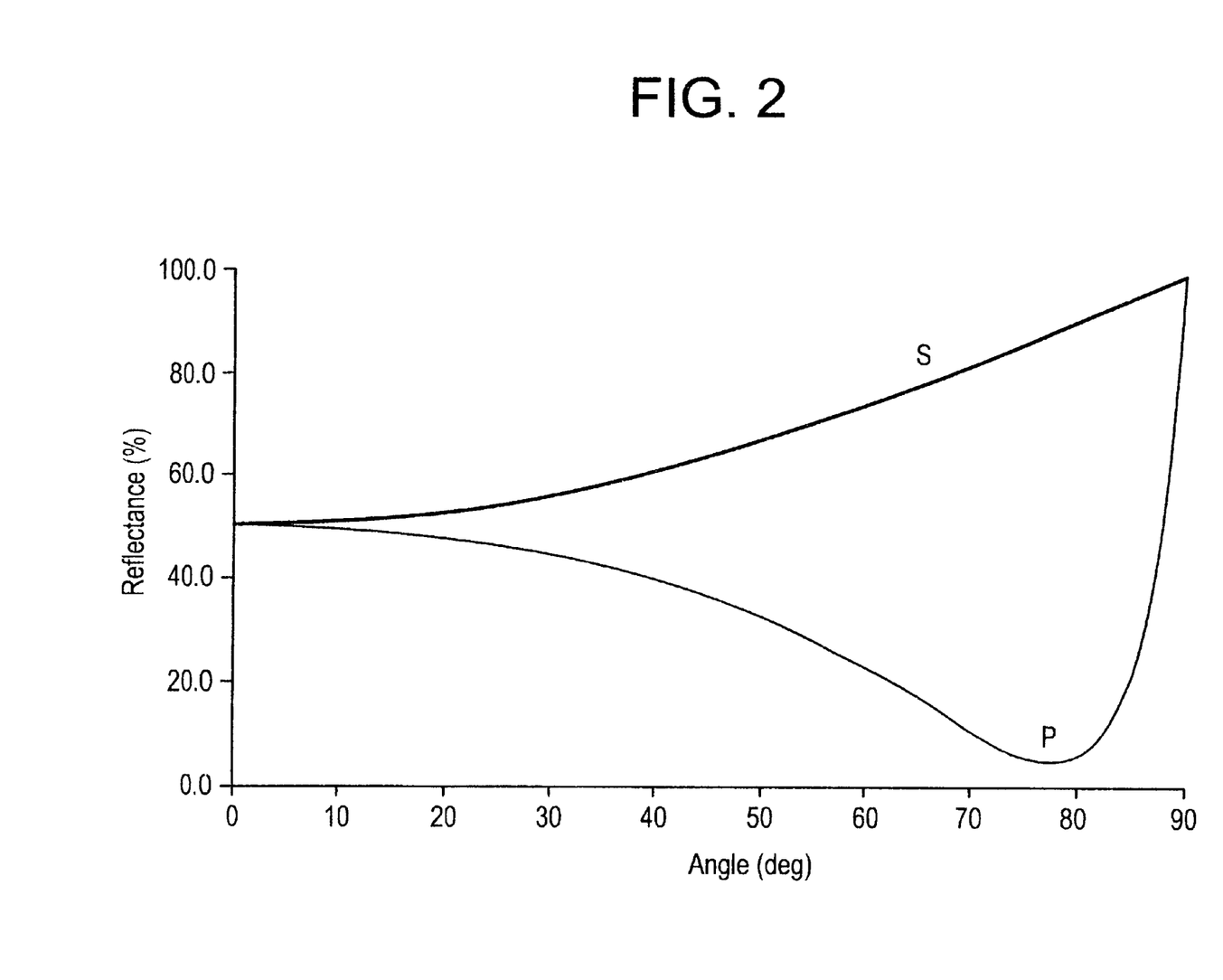
FIG. 2 is a graph showing the calculated P and S polarization components reflected from a film of polycrystalline silicon on a glass substrate.

We have found that a single thin layer of polycrystalline silicon film is a particularly useful dielectric material for the inventive polarizer. It enhances the polarization effect because of its high index of refraction relative to glass, it is reflective, and both its index of refraction and absorption are relatively constant over the visible wavelength spectrum. The combination of high index of refraction and low absorption significantly enhances the separation of P and S polarization components. FIG. 2 shows the calculated P and S polarization components reflected from a 36 nm thick polycrystalline silicon film on a glass substrate. Compared to FIG. 1, the reflection of the S polarization component has increased significantly over the entire range of incident angles. The reflection of the P polarization component has also increased, however, there is a minimum increase in the 79 degree region. This also shows that the optimum polarizing angle (relative to uncoated glass) is shifted by the addition of the silicon film. The degree of polarization at 79 degrees would give a contrast ratio of about 5:1.

Figure 3:
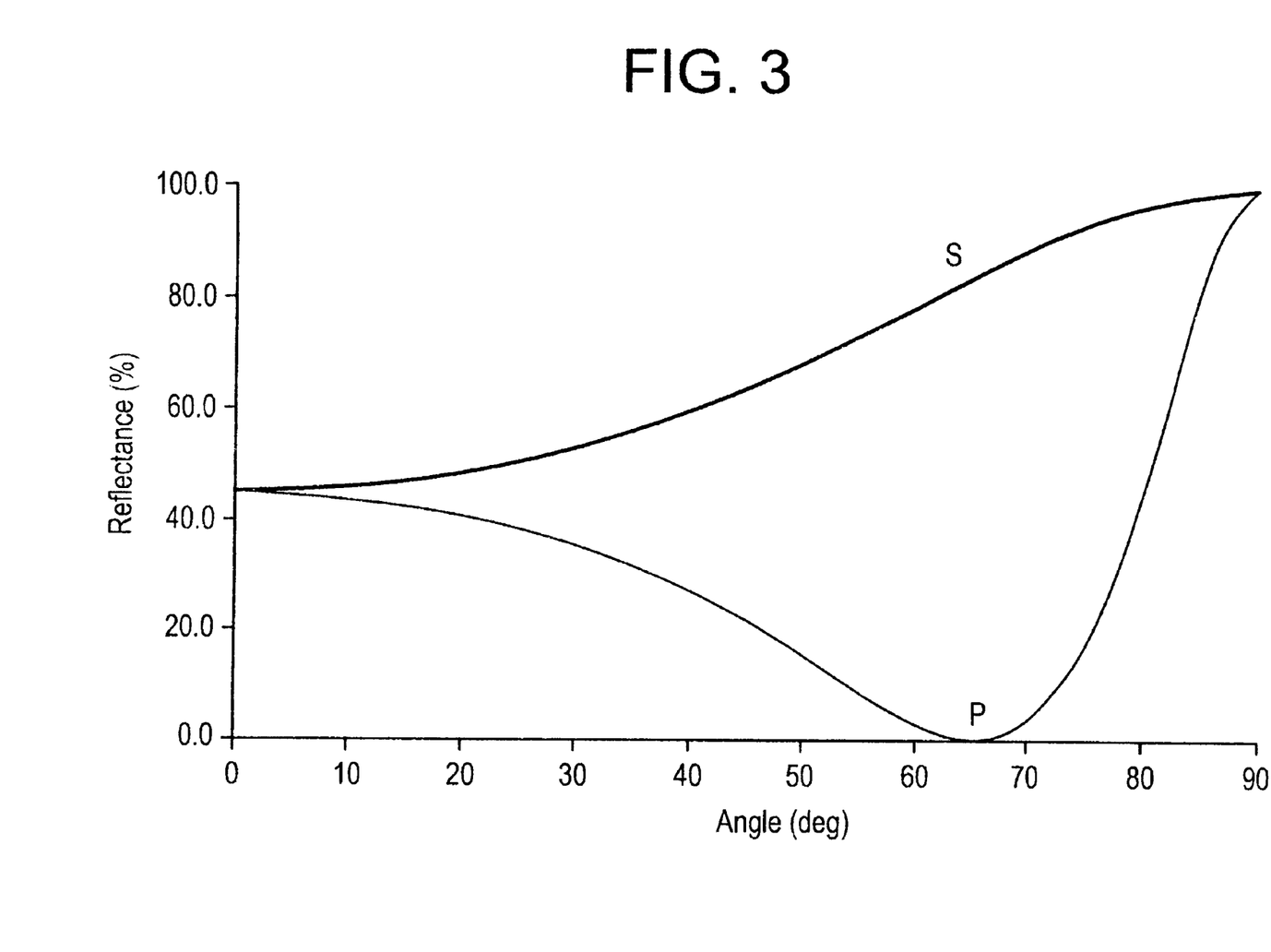
FIG. 3 is a graph showing the reflectance of the P and S polarization components in an inventive configuration of the silicon-coated substrate of FIG. 2 in which incident light first passes through glass, is then reflected off the silicon film coating, and then travels through the glass and out into the air.

We have found that the contrast ratio can be improved significantly by having the incident light pass through glass first, and then be reflected off a silicon film coating on the back or rear surface of the glass substrate. FIG. 3 shows the Is reflectance of the P and S polarization components in this inventive configuration. Here, the P polarization component is less than 1% at the 70° incident angle and the reflection of the S polarization component has decreased only slightly. As shown, the optimum polarization angle has shifted back toward the polarizing angle for uncoated glass. With the very low level of reflection of the P polarization component at the optimum incident angle, a high polarization contrast ratio could be obtained along with an acceptable level of reflected S polarization component.

Figure 4:
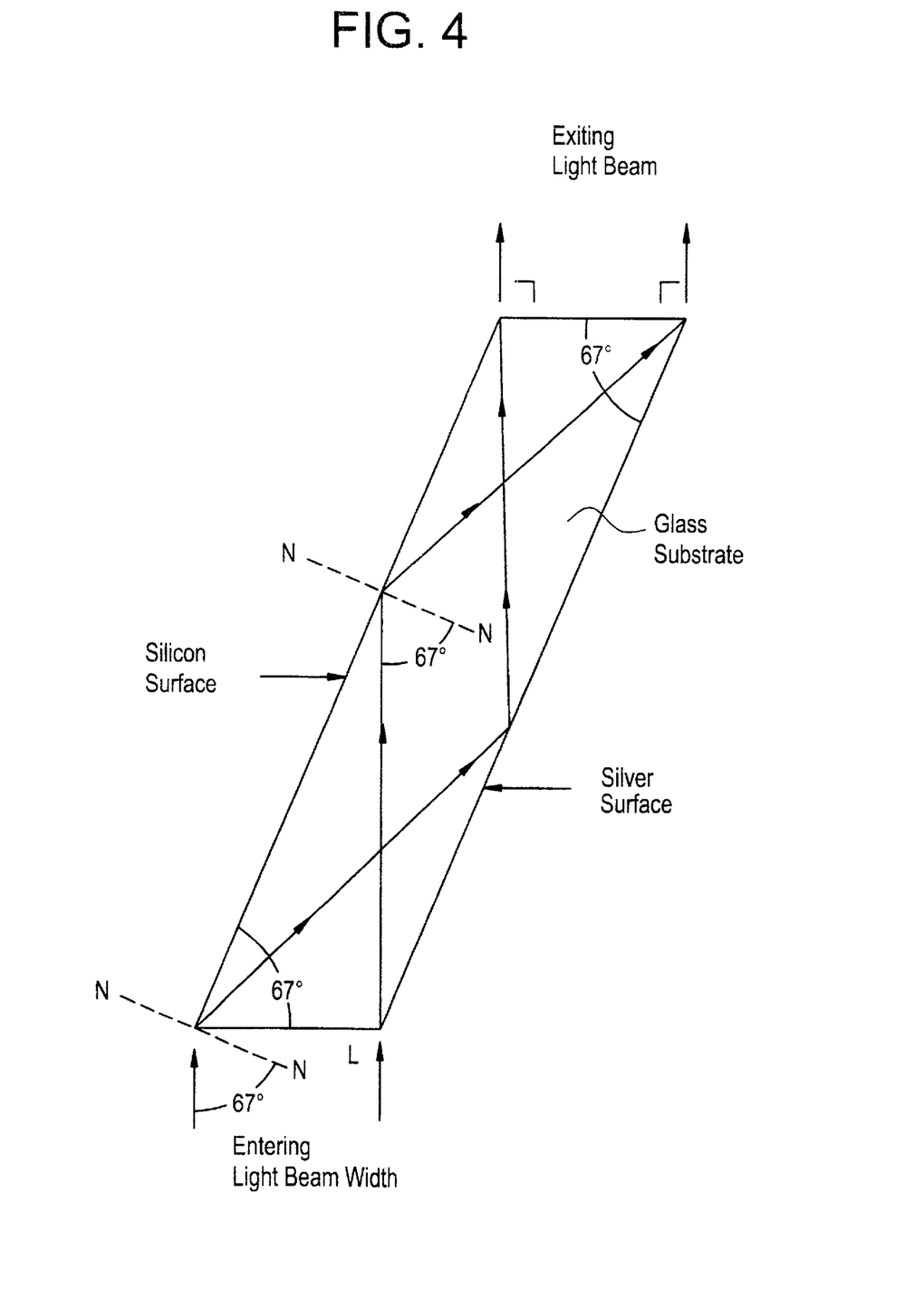
FIG. 4 is a schematic drawing showing the light path described in FIG. 3.

In order to exploit the above phenomenon we designed a unique polarizer whose basic application is illustrated in FIG. 4. As used herein, a polarizer "unit" consists of glass substrate that is coated on one surface with a thin polycrystalline silicon film and on the other surface with a fully reflecting metal film. Also, an additional film of light-absorbing material such as carbon or graphite may be coated over the silicon film. The thickness and the length of the substrate, along with the "bevel" of the entrance and exit edges are chosen to form a parallelogram with acute angles of 70°. With reference to FIG. 4, we have demonstrated that this geometry accomplishes the following:

a) light enters the polarizer unit normal to the air-glass interface thus avoiding refraction and reflection;
b) the light travels through the glass substrate before impinging on the silicon surface at the optimum Brewster polarizing angle of 70 degrees from normal;
c) after reflection off the silicon surface, the light is turned or deflected by the silver surface; and
d) finally, the light exits the polarizer through the exit edge, normal to the glass-air interface thus avoiding refraction and reflection.

The length of the polarizer unit is sized to have only one reflection of the light beam off the silicon and silver surfaces. Also, we have designed the polarizer to be bi-directional. By bi-directional we mean that equal polarizer performance is obtained regardless of the direction in which the light beam enters the substrate. That is, whether the light impinges on the silicon surface first and is turned by the silver surface, or whether light beam first impinges the metal surface before striking and being turned by the silicon surface. The Brewster angle of a polarizer depends on the index of refraction and absorption of the dielectric material as well as that of the substrate, and the thickness of the dielectric layer.

Figure 5:
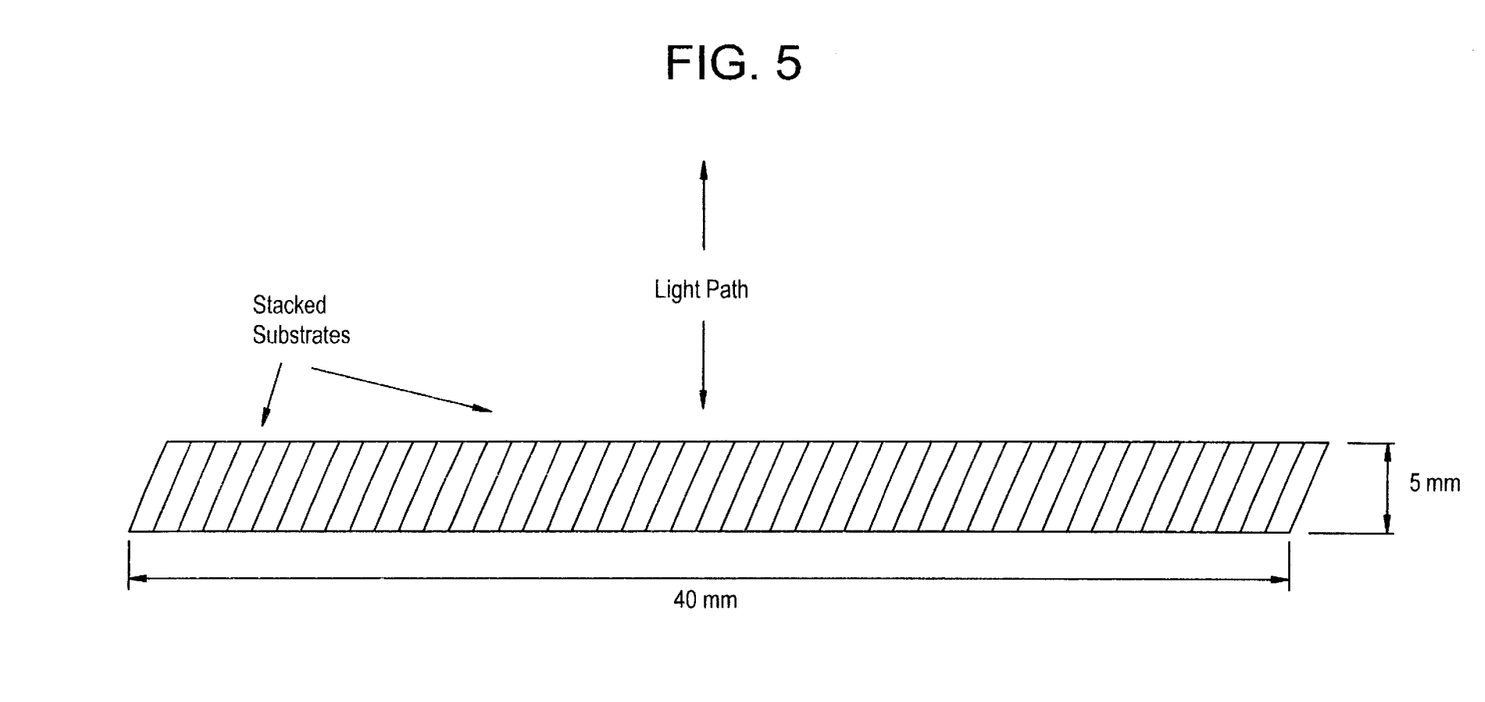
FIG. 5 is a schematic diagram showing a stack of coated glass substrates assembled to form a miniaturized polarizer according to the invention.
Figure 6:
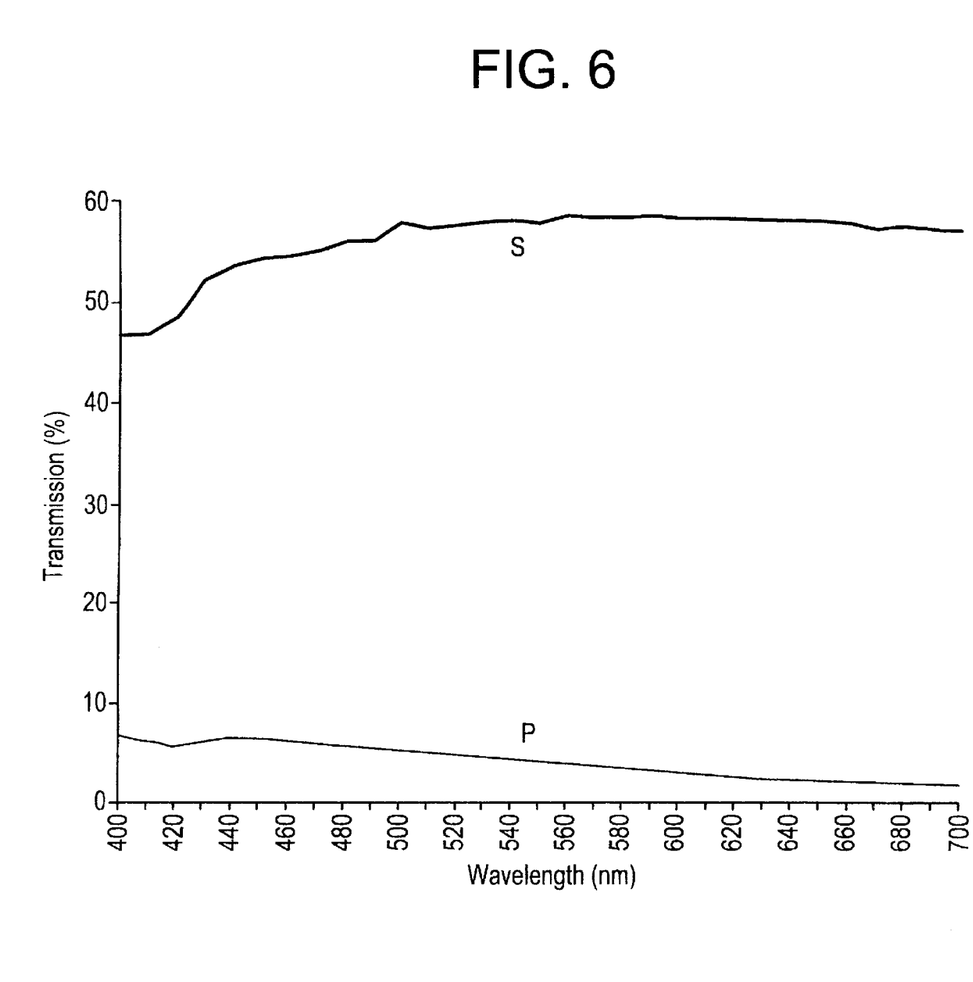
FIG. 6 is graph of transmittance versus wavelength for the P and S polarization components of the polarizer of FIG. 5.
Figure 7:
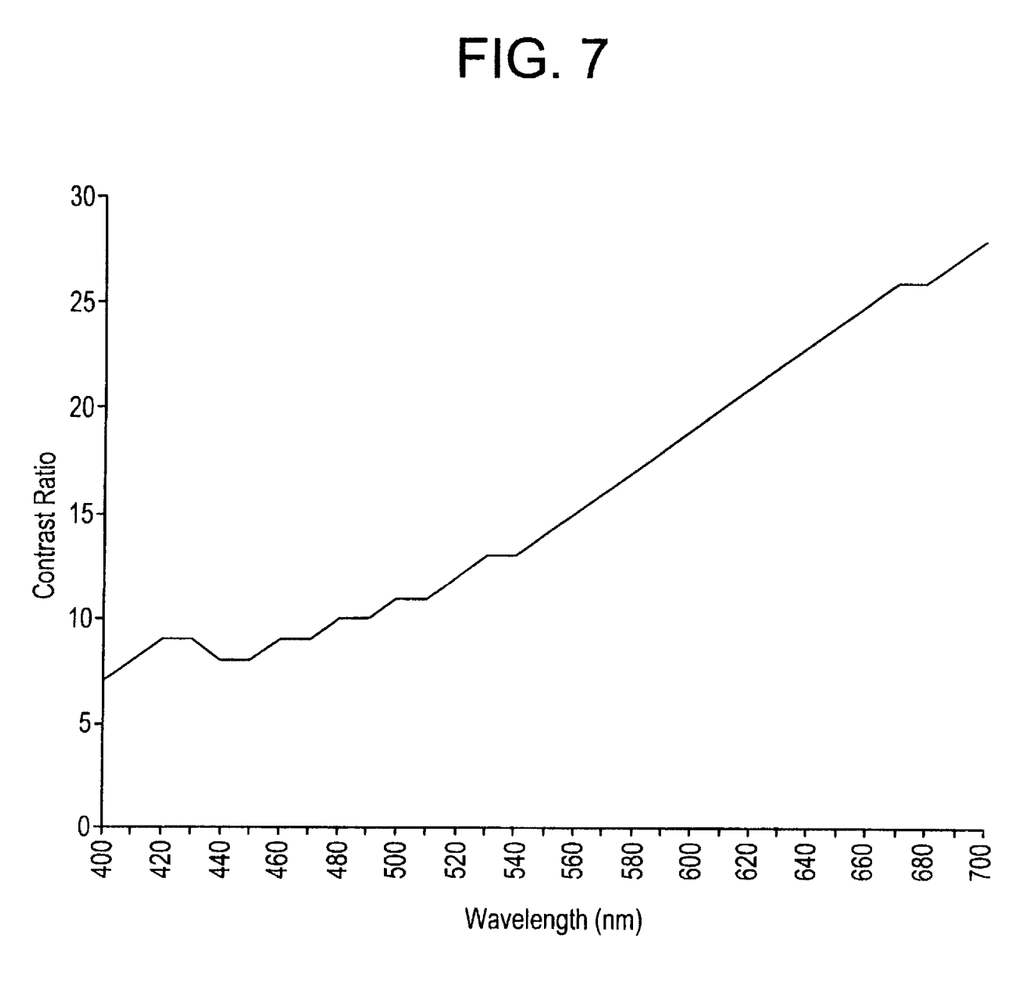
FIG. 7 is a graph showing the contrast ratio versus wavelength for the polarizer of FIG. 5.
Figure 8:
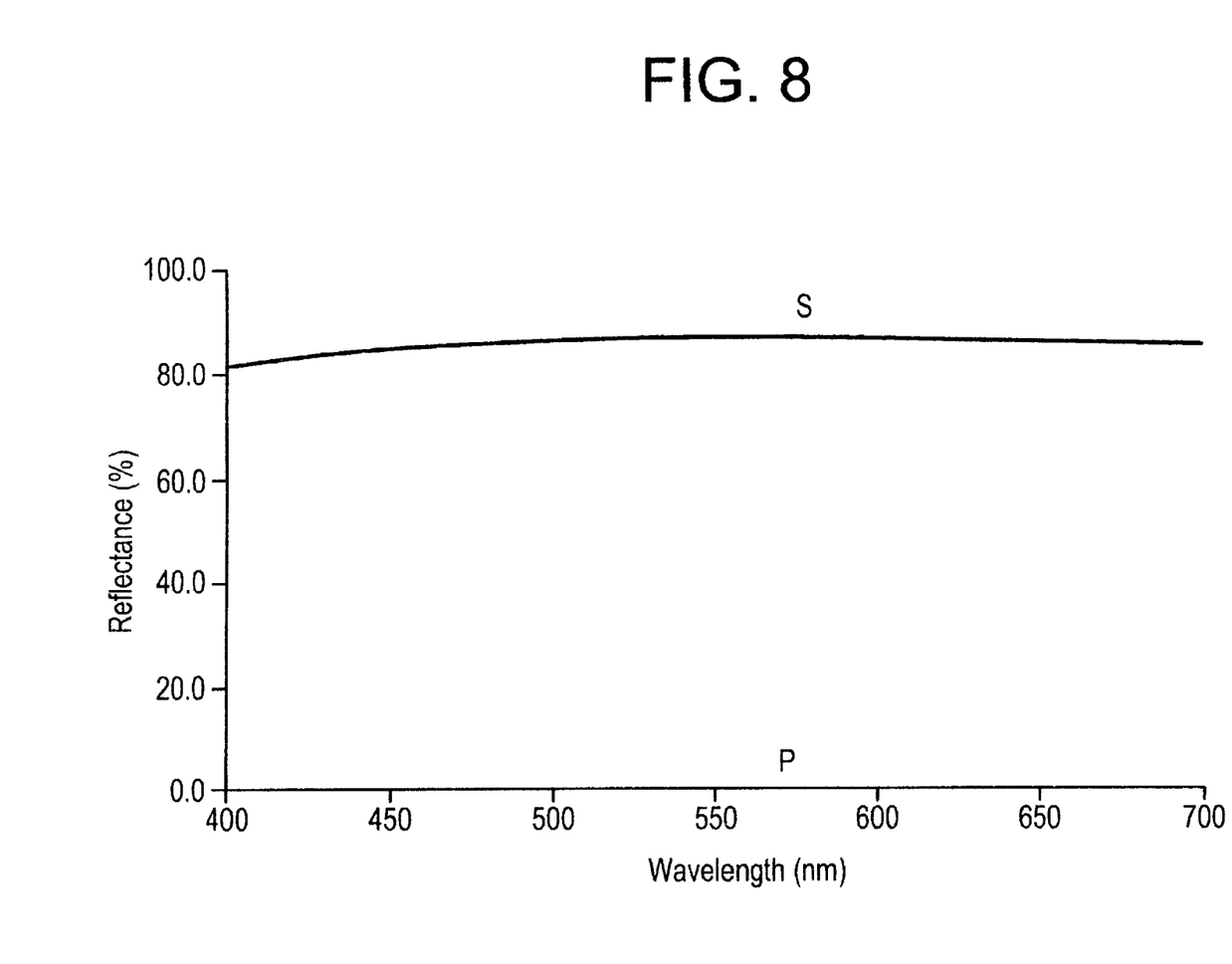
FIG. 8 is a graph showing the theoretical performance of an optimized polarizer according to FIG. 5.

We have discovered a unique method for making a miniaturized polarizer by combining several polarizer units as described above. The unique design and construction of the present miniaturized polarizer is best illustrated with reference to an illustrative application which requires the use of a pre-polarizer having an aperture of about 40×40 mm. Clearly, the overall size of a single glass substrate required to construct such a polarizer would have to be impractically large due to the wide aperture and required light path of the substrate. Surprisingly, we have found that the polarizer can be significantly miniaturized by reducing the thickness of the substrate and also by using a number of substrates stacked in parallel. Thus, by stacking forty (40) glass substrates each measuring 1 mm in thickness, a polarizer with a 40 mm square aperture and on overall thickness of about 5 mm can be produced. FIG. 5 and the example below illustrate this unique design and construction.

EXAMPLES

In the following example, we illustrate one preferred method for producing a miniaturized polarizer device having a 40 mm×40 mm square entrance and exit aperture, and requiring, as an example, a 70 degree Brewster angle that is dependent on the dielectric material chosen.

1) Forty substrates each measuring one millimeter thick by 40 mm wide by 100 mm long were prepared.

2) The substrates were each coated as follows: the first surface of each substrate was first coated with a thin layer (about 36 nm) polycrystalline silicon film, a highly reflecting silver film (about 100 nm) was coated on the second surface of each substrate, and then a light-absorbing film (graphite) was coated over the silicon film.

3) All 40 substrates were stacked in parallel with the graphite film of each substrate incontact with the metal film of the adjacent substrate.

4) The substrate assembly was bound together at each end of the long (100 mm) dimension, using wire or plastic "cable ties."

5) The bound substrate assembly was placed centrally in a mold having a square cavity measuring 50 mm square by 100 nm deep, such that the substrate assembly rested on the 40 mm by 40 mm dimension "end" of the assembly.

6) The annular space between the interior mold walls and the substrate assembly was filled with an epoxy polymer and allowed to set to form a polarizer "boule".

7) Upon setting, the polarizer boule was cut into individual polarizer devices by placing the boule with its long (100) dimension resting horizontally on a cutting table and also having the substrates standing on edge. The boule was then cut horizontally across its 40 mm dimension and at an angle of 70 degrees relative to the plane of the long (100 mm) axis of the boule using a diamond saw. We have found that using this process, and accounting for cutting and other losses, at least 12 polarizer devices, each measuring 5 mm in thickness and having an aperture of 40 by 40 mm can be obtained.

What is claimed is:

1. A reflective, optical polarizer comprising: a transparent, inorganic substrate having a first surface coated with a layer of dielectric material, and a second surface coated with a layer of either a dielectric material or a highly reflective metal; the substrate being configured such that a S-polarized light beam exiting the substrate maintains the same, original direction as a corresponding incident light beam entering the substrate; and said polarizer exhibits polarization over the entire visible spectrum.

2. The optical polarizer according to claim 1, further comprising a film of light absorbing material over one of said coated surfaces.

3. The optical polarizer according to claim 1, wherein said substrate is fused silica, glass, or glass-ceramic material.

4. The optical polarizer according to claim 1, wherein the same dielectric material coats said first and second surfaces.

5. The optical polarizer according to claim 1, wherein said second surface is coated with a highly reflective metal film and a dielectric material.

6. The optical polarizer according to claim 1, wherein said highly reflective material is silver or aluminum.

7. The optical polarizer according to claim 1, wherein said dielectric material includes polycrystalline silicon, amorphous silicon, gallium phosphide, aluminum arsenide, aluminum phosphide, silicon carbide, zinc selenide or zinc telluride.

8. The optical polarizer according to claim 1, wherein said dielectric material is polycrystalline silicon.

9. The optical polarizer according to claim 1, wherein said dielectric material has a higher refractive index than that of the transparent substrate.

10. The optical polarizer according to claim 1, wherein said dielectric material has a low light absorption.

11. The optical polarizer according to claim 1, wherein the refractive index and absorption of said dielectric material are relatively constant over the spectrum of visible wavelengths.

12. The optical polarizer according to claim 1, further comprising a first and second opposing edge, wherein relative to the planes of the coated surfaces, each plane of said edges forms an angle equivalent to the Brewster angle.

13. The optical polarizer according to claim 1, wherein said transparent substrate has a refractive index which optimizes polarization performance when paired with the refractive indices of said dielectric material on either said first and second coated surfaces.

14. The optical polarizer according to claim 2, wherein said light absorbing material is carbon.

15. The optical polarizer according to claim 2, wherein said light absorbing material is graphite.

16. The optical polarizer according to claim 3, wherein said substrate is an UV-absorbing glass.

17. The optical polarizer according to claim 12, wherein said incident light beam first enters the substrate through said first opposing edge and travels through the substrate prior to striking either first or second coated surface.

18. The optical polarizer according to claim 12, wherein said opposing edges are substantially orthogonal to said incident light beam, and an alignment of said opposing edges do not cause refraction of said incident light beam at said opposing edges.

19. The optical polarizer according to claim 12, wherein said opposing edges have a coating of anti-reflective material.

20. The optical polarizer according to claim 17, wherein after striking either first or second coated surface, said incident light beam reflects off the other coated surface and exits from the polarizer through second opposing edge.

21. The optical polarizer according to claim 20, wherein the polarizer exhibits equal polarizing performance regardless from which of said first and second opposing edges the incident light beam first enters the substrate.

22. The optical polarizer according to claim 20, wherein the polarizer exhibits equal polarizing performance regardless of which of said first and second coated surfaces the incident light beam strikes first.

23. An optical polarizer of visible light, the polarizer including: a transparent substrate having opposing, first and second planar major surfaces and opposing, entrance and exit edges; said first surface having a layer of dielectric material and said second surface having either a layer of highly reflective metal film or a dielectric material; the substrate being configured such that a S-polarized light ray exiting the exit edge is substantially parallel with a corresponding incident light ray striking the entrance edge; and said polarizer exhibits polarization over the entire visible spectrum.

24. The optical polarizier according to claim 23, further comprising a film of light absorbing material over one of said coated surfaces.

25. The optical polarizer according to claim 23, wherein said substrate is fused silica, glass, or glass-ceramic material.

26. The optical polarizer according to claim 23, wherein said substrate is an UV-absorbing glass.

27. The optical polarizer according to claim 23, wherein the same dielectric material coats said first and second surfaces.

28. The optical polarizer according to claim 23, wherein said second surface is coated with a highly reflective metal film and a dielectric material.

29. The optical polarizer according to claim 23, wherein said highly reflective material is silver or aluminum.

30. The optical polarizer according to claim 23, wherein said dielectric material includes polycrystalline silicon, amorphous silicon, gallium phosphide, aluminum arsenide, aluminum phosphide, silicon carbide, zinc selenide or zinc telluride.

31. The optical polarizer according to claim 23, wherein said dielectric material is polycrystalline silicon.

32. The optical polarizer according to claim 23, wherein said dielectric material has a higher refractive index than that of the transparent substrate.

33. The optical polarizer according to claim 23, in relative to the planes of the coated surfaces, each plane of said opposing edges forms an angle equivalent to the Brewster angle.

34. An apparatus comprising the optical polarizer according to either claim 1 or 23.

35. The optical polarizer according to claim 24, wherein said light absorbing material is carbon.

36. The optical polarizer according to claim 24, wherein said light absorbing material is graphite.

37. An optical device comprising:
  an optical polarizing unit that exhibits polarization over the entire visible spectrum, said unit including:
    a transparent, inorganic substrate, configured such that a light beam exiting the substrate maintains the same, original direction as the corresponding incident light beam entering the substrate, and having a first surface coated with a layer of dielectric material, and a second surface coated with a layer of either a dielectric material or a highly reflective metal film; and
    a film of light-absorbing material applied over at least one of said coated surfaces.

38. The optical device according to claim 37, wherein a plurality of said optical polarizing units are assembled in parallel formation such that a first coated surface is in contact with a second coated surface of an adjacent polarizing unit.

39. The optical device according to claim 37, wherein said film of light absorbing material is applied over said second coated surface.

40. The optical polarizer according to claims 37, wherein said substrate is fused silica, glass, or glass-ceramic material.

41. The optical polarizer according to claim 37, wherein said substrate is an UV-absorbing glass.

42. The optical polarizer according to claim 37, wherein the same dielectric material coats said first and second surfaces.

43. The optical polarizer according to claim 37, wherein said second surface is coated with a highly reflective metal film and a dielectric material.

44. The optical polarizer according to claim 37, wherein said highly reflective material is silver or aluminum.

45. The optical polarizer according to claim 37, wherein said dielectric material includes polycrystalline silicon, amorphous silicon, gallium phosphide, aluminum arsenide, aluminum phosphide, silicon carbide, zinc selenide or zinc telluride.

46. The optical polarizer according to claim 37, wherein said dielectric material is polycrystalline silicon.

47. The optical polarizer according to claim 37, wherein said dielectric material has a higher refractive index than that of the transparent substrate.

48. The optical polarizer according to claim 37, wherein relative to the planes of the coated surfaces, each plane of said opposing edges forms an angle equivalent to the Brewster angle.

49. The optical polarizer according to claim 39, wherein said light absorbing material is carbon.

50. The optical polarizer according to claim 39, wherein said light absorbing material is graphite.

51. The optical polarizer according to claim 45, wherein said light absorbing material is carbon.

52. The optical polarizer according to claim 45, wherein said light absorbing material is graphite.

53. A method for fabricating a miniaturized polarizer device, the method comprising: preparing a plurality of polarizer units, each polarizer unit comprising a transparent, inorganic substrate having opposing, first and second planar major surfaces; applying to the first surface a layer of dielectric material and the second surface a layer of either a dielectric material or a highly reflective metal film; applying a light-absorbing layer over at least one of said coated surfaces; assembling the polarizer units in parallel formation, such that the first coated surface is in contact with the second coated surface of an adjacent polarizer unit; and binding the assembled polarizer units.

54. The method according to claim 53, further comprises: placing the bound polarizer units in a mold; encapsulating the bound polarizer units in a compound to form a polarizer boule; and cutting the boule to form individual polarizer devices.

55. The method according to claim 53, further comprising polishing to optical quality the cut surfaces of each polarizer device.

56. The method according to claim 53, wherein the cut surfaces comprising two opposing edges, wherein relative to the planes of the coated surfaces, a plane of said edges forms an angle equivalent to the Brewster angle.

57. The method according to claim 53, wherein the encapulating compound is selected from the group consisting of epoxy polymer, sorel cement, and low melting point metal alloy.

58. The method according to claim 53, wherein a plurality of said optical polarizing units are assembled in parallel formation such that a first coated surface is in contact with a second coated surface of an adjacent polarizing unit.

59. The method according to claim 53, wherein said layer of light absorbing material is applied over said second coated surface.

60. The optical polarizer according to claim 53, wherein said substrate is fused silica, glass, or glass-ceramic material.

61. The optical polarizer according to claim 53, wherein said substrate is an UV-absorbing glass.

62. The optical polarizer according to claim 53, wherein the same dielectric material coats aid first and second surfaces.

63. The optical polarizer according to claim 53, wherein said second surface is coated with a highly reflective metal film and a dielectric material.

64. The optical polarizer according to claim 53, wherein said highly reflective material is silver or aluminum.

65. The optical polarizer according to claim 53, wherein said dielectric material includes polycrystalline silicon, amorphous silicon, gallium phosphide, aluminum arsenide, aluminum phosphide, silicon carbide, zinc selenide or zinc telluride.

66. The optical polarizer according to claim 53, wherein said dielectric material is polycrystalline silicon.

67. The optical polarizer according to claim 53, wherein said dielectric material has a higher refractive index than that of the transparent substrate.

* * * * *

UNITED STATES PATENT AND TRADEMARK OFFICE
CERTIFICATE OF CORRECTION

PATENT NO.    : 6,654,168 B1
DATED         : November 25, 2003
INVENTOR(S)   : Nicholas F. Borrelli et al.

It is certified that error appears in the above-identified patent and that said Letters Patent is hereby corrected as shown below:

<u>Column 8,</u>
Line 40, please delete "in" and add -- wherein --

<u>Column 10,</u>
Line 31, please delete "aid" and add -- said --

Signed and Sealed this

Twenty-fourth Day of February, 2004

JON W. DUDAS
*Acting Director of the United States Patent and Trademark Office*